United States Patent
Voaden

[11] 3,891,736
[45] June 24, 1975

[54] PROCESS FOR SHAPING POLYTETRAFLUOROETHYLENE SHEET

[75] Inventor: Arthur Trevor Voaden, Welwyn Garden City, England

[73] Assignee: Imperial Chemical Industries Limited, London, England

[22] Filed: Oct. 8, 1971

[21] Appl. No.: 187,648

[30] Foreign Application Priority Data
Oct. 16, 1970 United Kingdom............. 49285/70
Jan. 26, 1971 United Kingdom................ 3166/71

[52] U.S. Cl. ................... 264/92; 264/89; 264/93; 264/314; 264/316; 264/323
[51] Int. Cl. ............................................ B29c 17/04
[58] Field of Search .......... 264/89, 90, 92, 93, 323

[56] References Cited
UNITED STATES PATENTS
| | | | |
|---|---|---|---|
| 2,354,916 | 8/1944 | Hurt | 264/90 |
| 2,801,947 | 8/1957 | Winchester et al. | 264/90 |
| 2,915,427 | 12/1959 | Schriner et al. | 264/90 X |
| 3,124,623 | 3/1964 | Slawson | 264/1 |
| 3,172,928 | 3/1965 | Johnson | 264/323 X |
| 3,608,055 | 9/1971 | Long | 264/90 X |

*Primary Examiner*—Jeffery R. Thurlow
*Assistant Examiner*—Allen M. Sokal
*Attorney, Agent, or Firm*—Cushman, Darby & Cushman

[57] ABSTRACT

A process for shaping PTFE wherein a heated sheet of PTFE positioned inside a concave mould with its periphery free to move in relation to the mould surface is subjected to fluid pressure to cause the sheet to conform to the mould surface.

5 Claims, 14 Drawing Figures

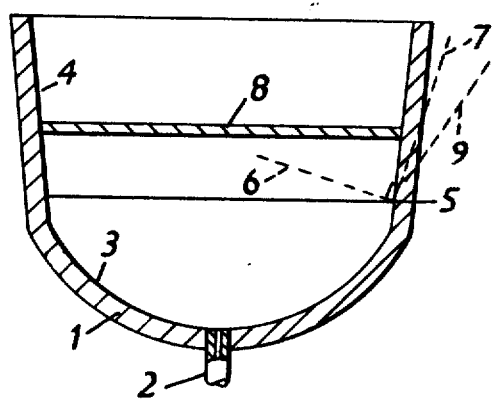
FIG. 1.
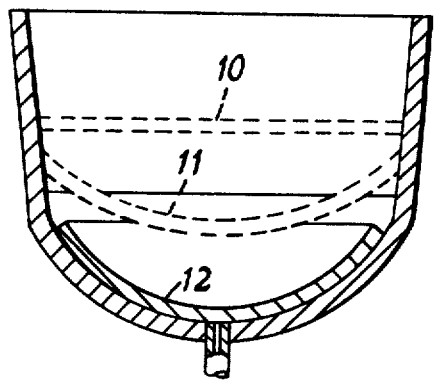
FIG. 2.
FIG. 3.
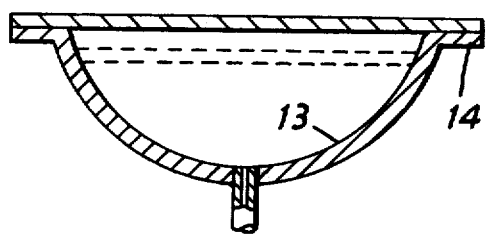

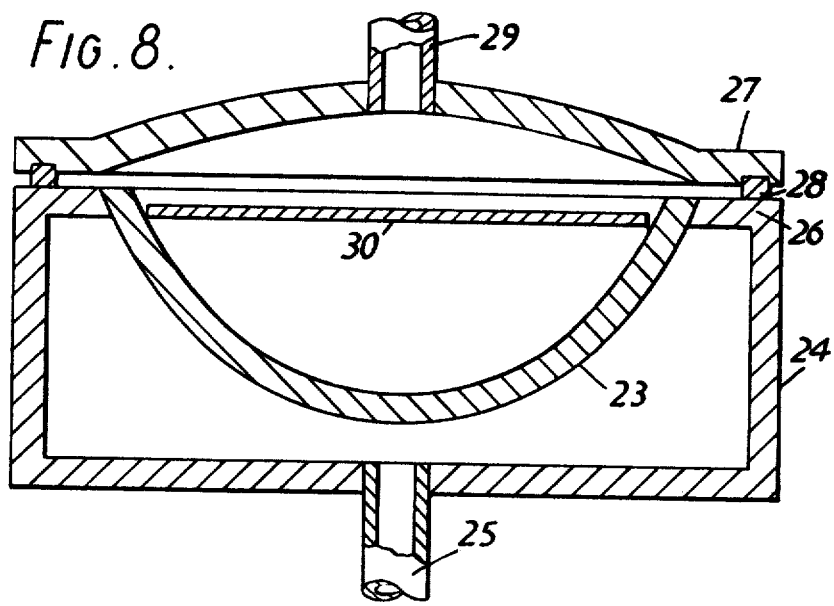
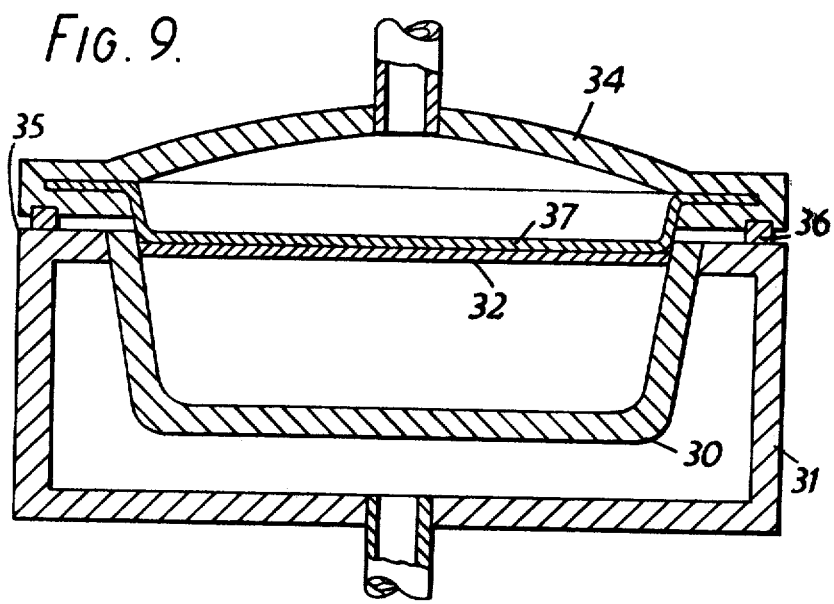

PROCESS FOR SHAPING POLYTETRAFLUOROETHYLENE SHEET

This invention relates to a shaping process and in particular to a process for forming shaped articles from sheets of polytetrafluoroethylene. By polytetrafluoroethylene, hereinafter referred to as PTFE, we include tetrafluoroethylene homopolymers and copolymers of tetrafluoroethylene with a minor amount, (for example up to 10 percent by weight of the polymer), of one or more comonomers such as ethylene or hexafluoropropene.

The PTFE may incorporate one or more fillers. Examples of fillers that may be used include glass, graphite and bronze. Filled compositions generally contain from 10 to 40 percent by volume of the filler.

PTFE articles have heretofore been formed by making a preform of suitable shape by compacting PTFE powder and then sintering the preform. Generally, only relatively simple shapes e.g. rods, blocks, rings and sheets can be made directly by this method and so, when making more complex shapes, it is often necessary to machine the article from a simpler sintered stock shape. This process is, of course, often very wasteful and time consuming. Another method that has been adopted for preforming more complex shapes is isostatic moulding. This process, however, requires complicated and robust equipment.

It would be desirable to devise a method of fabricating PTFE in a manner akin to the vacuum forming processes utilised for other thermoplastic materials.

However, attempts to vacuum form PTFE in the normal manner wherein a sheet of the polymer, clamped round its periphery, is heated and then drawn into a mould, have resulted in splitting of the sheet of PTFE if more than a shallow degree of draw is required.

In British Pat. Specification No. 970 508, a method of obtaining deep drawn articles was described wherein, in addition to pressure applied normally to a fluorocarbon polymer sheet to force it to conform to the shape of the mould recess, pressure was separately applied to the edge of the sheet to assist flow of the sheet into the mould recess.

We have found that by adopting a certain technique, the need for the pressure applied separately to the edge of the sheet can be eliminated.

According to this invention we provide a process for the manufacture of shaped articles of polytetrafluoroethylene wherein a sheet of polytetrafluoroethylene, heated to a temperature at which it is shapable by fluid pressure and positioned inside a concave mould with its periphery free to move over the mould surface, is subjected to fluid pressure so as to cause the sheet to conform to the shape of the mould surface and is held in such state until it has cooled sufficiently to be form stable.

The mould used is concave, i.e., bowl or dish shaped and essentially free of convex portions. In its simplest form the mould has a simple curved cross-section such as a parabola, hyperbola or a part circle and preferably the mould surface conforms to the surface of a paraboloid, hyperboloid or part or all of a hemisphere.

The mould surface may, if desired, incorporate flat or conical portions, e.g., a flat base and/or conical or tapered walls. However, to avoid convex surfaces and projections into the mould, it will be appreciated that, at the junction of a flat or conical portion of the mould surface and a curved portion of the mould surface, said flat or conical portion should preferably, in section, be at an angle of 90° or less than 90° to the normal, in the direction of the centre of curvature of the curved portion at said junction, to the tangent to the curved portion at the junction.

Various embodiments of the invention are illustrated by reference to the accompanying drawings wherein FIG. 1 is a diagrammatic cross-section through a mould showing the position of the sheet before shaping;

FIG. 2 is a view similar to FIG. 1 showing the position of the sheet during application of fluid pressure;

FIG. 3 is a view similar to FIG. 1 showing an inoperative system;

FIG. 8 is a view similar to FIG. 1 but showing an alternative method of applying fluid pressure;

FIG. 9 is a view similar to FIG. 8 utilising a rubber sheet sealing means showing a mould suitable for shaping a sheet into a tray-like moulding;

Figure 4:
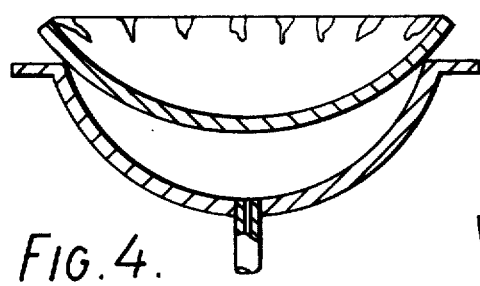
FIG. 4 is a view similar to FIG. 3 showing the sheet during moulding in the system depicted in FIG. 3.

In FIG. 1 there is shown a mould 1 made of metal and provided at its base with a port 2 for application of vacuum. The mould 1 has a generally part hemispherical moulding surface 3 terminating in conical tapered sides 4. The junction of the conical portion 4 and the curved surface is indicated by reference numeral 5. It is desirable that, in section, the conical portion 4 is at an angle equal to, or less than 90° to the normal (indicated by reference numeral 6) to the tangent (indicated by reference numeral 7) to the curved surface 3 at junction 5 if the diameter of the sheet 8 to be shaped is substantially in excess of the diameter of the mould at junction 5. Thus a mould having conical portions having a section corresponding to the line 9 at an angle of more than 90° to normal 6 is not satisfactory if the sheet 8 has a diameter substantially in excess of the diameter of the mould at junction 5. This case is illustrated in FIGS. 3 and 4 described later.

The sheet 8 of PTFE to be shaped is heated until it is shapable by application of the vacuum.

Vacuum is then applied to port 2 and causes the heat softened sheet 8 to be drawn downwards towards the port. As the sheet 8 is drawn down, the edges of the sheet 8 slide over the mould surfaces 3 and 4 but at the same time provide a seal to prevent ingress of air, thereby preserving the vacuum. The successive positions (indicated by reference numerals 10, 11 and 12) of the sheet during the shaping process are shown in FIG. 2. The vacuum is maintained after all the sheet contacts the mould surface until the shaped sheet has cooled sufficiently to become form stable, by which we mean that it can be removed from the mould without reverting to its original flat state.

If the sheet tends to move unsymmetrically with respect to the axis of the mould, it may be guided by applying gripping means centrally to it, the gripping means being mounted for axial movement with respect to the mould.

In the system shown in FIG. 3, the mould is of the conventional vacuum forming type; i.e., in the form of a recess bounded by a flat planar flange. This type of mould has a "convex" portion where the concave recess 13 meets the surrounding flange or plate 14. The angle between the planar portion 14 and the normal to the tangent to the curved surface at the junction of the recess 13 and flat portion 14 is more than 90°.

This type of mould is satisfactory if the sheet being shaped is small enough to be located entirely within the recess 13, i.e., as indicated by the broken line, since the "convex" part of the mould in no way affects or contacts the sheet during shaping. On the other hand, if the sheet is larger as shown in FIG. 4 and cannot be located inside the concave recess 13, i.e., a substantial area overlies the flange 14 as shown in full lines, the centre of the sheet on application of the vacuum is drawn into the recess but the edges of the sheet lift from the flat portion 14 and are hence unsupported. We have found that such unsupported edges tend to buckle during the shaping process as is indicated in FIG. 4. Clamping the edges, as in a normal vacuum forming process causes splitting of the sheet if more than a shallow draw is attempted. In the somewhat similar arrangement indicated in the said British Specification No. 970 508, edge portions of the sheet are prevented from lifting but are constrained to pass over an essentially rectangular convex portion, edge pressure on the sheet being required to produce the necessary movement and shaping of the sheet.

In the method of the present invention, the sheet is heated, prior to shaping, to a temperature at which it is shapable by the available fluid pressure. The precise temperature that is necessary depends on a variety of factors including depth of draw, shape of mould, available fluid pressure (as described hereinafter, shaping can be effected by application of vacuum to the underside of the sheet, by superatmospheric fluid pressure to the top of the sheet or by a combination of vacuum and superatmospheric fluid pressure), thickness of the sheet and nature of the PTFE composition. Generally we have found that good results may be obtained by heating the sheet to above 300°C before shaping. The sheet may be heated in the mould, for example by radiant heaters, or it may be heated in an oven and then placed in the mould and fluid pressure applied. In the latter case, some cooling of the sheet after it is removed from the oven and before applying the fluid pressure will occur but by careful planning of equipment positioning and of handling this cooling can be kept relatively small. Particularly good results have been obtained by heating the sheet in an oven to 360°C and then transferring it to the mould.

If desired a core can be provided in the mould. A suitable hole is provided in the sheet prior to heating and location in the mould.

Figure 5:
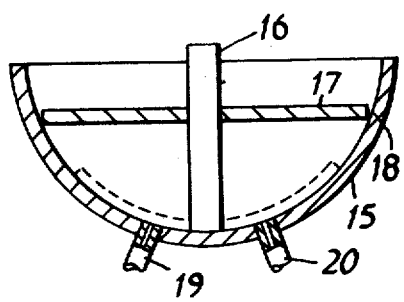
FIG. 5 is a view similar to FIG. 1 but illustrating a mould with a core.

In the system depicted in FIG. 5 the mould 15 is provided with a central cylindrical upstanding axial core 16. Prior to heating, an orifice is formed in the sheet 17 of a size to form a close sliding fit on the core 16 when the sheet is heated. The heated sheet 17, located round the core 16 with the periphery 18 of the sheet engaging with the curved surface of mould 15, is then drawn into the mould recess by vacuum applied through ports 19 and 20. As the sheet is drawn down, the periphery 18 of the sheet slides, and seals, against the surface of the mould 15 while the central orifice in sheet 17 slides down core 16 which consequently forms a guide for the sheet. In this way a dish shaped annular object can be formed. For example, using a mould similar to that illustrated in FIG. 5, a filled PTFE sheet of 38.1 cm diameter and 0.8 cm thickness, having a central hole of 1.9 cm diameter, can be formed to part spherical shape by heating it at 360°C for ½ hour and then placing it in the mould and applying a vacuum between the mould and the sheet and subsequently cooling.

Figure 6:
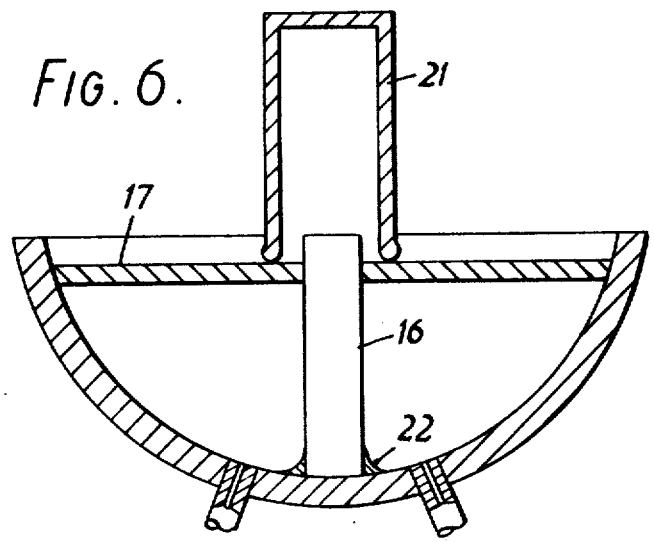
FIG. 6 is a view similar to FIG. 5 showing a method of shaping an article when using a core in the mould.

When using a core in the mould, it is desirable to obtain a good seal round the core to prevent air leakage during application of vacuum or fluid pressure. One suitable method is shown in FIG. 6.

Figure 7:
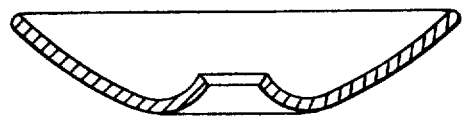
FIG. 7 is a cross-section of a moulding prepared using the system of FIG. 6.

The system used here is very similar to that described above in relation to FIG. 5 but after locating the sheet 17 on the core 16 and before application of vacuum, a tubular member 21 having one open end and one closed end is located over the end of the core 16, so that the open end engages with and seals against the upper surface of the sheet 17. On application of the vacuum, the sheet 17 is drawn downwards, carrying tubular member 21 with it, thereby maintaining the seal. The edge of member 21 at the open end is shaped to conform to a fillet.

Where it is desired to make an article of the type shown in cross-section in FIG. 7, i.e., having the orifice recessed, a fillet round the base of the core 16 can be used. Such a fillet is indicated by reference numeral 22 in FIG. 6. Where such a fillet is used, the tubular member 21 should be shaped at the open end as shown in FIG. 6 to conform to the shape of the fillet 22 and retain the seal on the upper surface of the sheet 17 when the portion of sheet 17 near the core 16 is deformed by the fillet 22.

As mentioned hereinbefore, the shaping may be effected by means of a vacuum applied to the underside of the sheet as in the systems illustrated in FIGS. 1 to 6, or it may be effected by means of a superatmospheric fluid pressure applied to the upper side of the sheet. Such pressure may be applied by a gas or by a suitable liquid. Gas pressure is to be preferred for ease of operation. Alternatively, both vacuum and superatmospheric fluid pressure may be employed. Where superatmospheric pressure is employed, means are preferably provided to permit air trapped between the underside of the sheet and the mould surface to escape. Such means may take the form of vents (to which vacuum may be applied if a combined vacuum and superatmospheric fluid pressure actuating system is employed) or the mould may be made of a porous material such as porous sintered metal. In the latter case, if vacuum assistance is to be employed, the porous mould may be made as one face of a plenum chamber to which the vacuum is applied.

Such a system is illustrated by FIG. 8. Here the mould 23 is made of porous sintered metal and forms one face of a box 24 from which air may be exhausted by a vacuum line 25. The mould has a flat flange 26 to which a dished lid 27 may be sealed. Sealing between the lid 27 and the flange 26 is effected by a sealing ring 28. The lid may be held in place with regard to flange 26 by quick acting clamps (not shown). Fluid pressure may be applied to the interior of the dished lid via port 29. In operation the heated sheet 30 is located inside the concave part of mould 23 and the lid 27 is sealed to the flange 26. Box 24 is evacuated and at the same time pressure applied to the interior of the lid via port 29.

When the sheet is not circular, in some cases a fluid tight seal will not be maintained between the sheet and the mould throughout the shaping process. Accordingly, in such cases, it is necessary to provide a seal to prevent passage of fluid past the sheet. One convenient method of effecting such a seal is by placing a high temperature resistant extensible sheet, for example a silicone rubber sheet on top of the sheet of PTFE, and clamping this to the mould. In some cases such a system may also be of use when using circular sheets.

Figure 10:
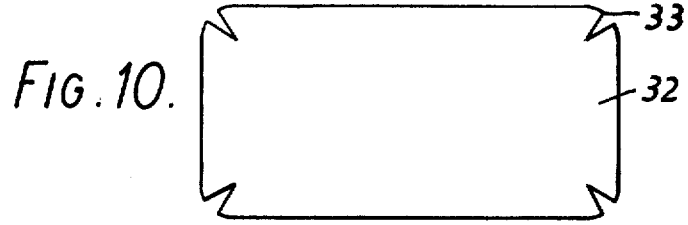
FIG. 10 is a plan view of a sheet suitable for making a tray-like moulding.
Figure 11:
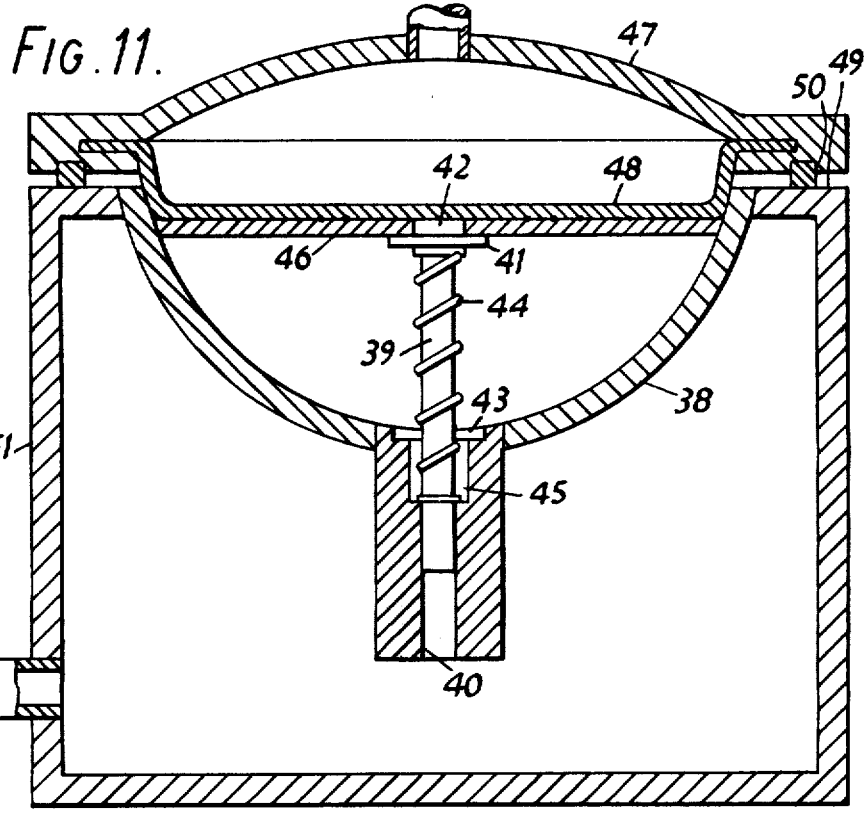
FIG. 11 is a view similar to FIG. 9 showing a method of moulding a hemispherical article with a central orifice using a rubber sheet sealing means.

An illustration of this system is given in FIG. 9 wherein a porous sintered metal mould 30 of generally rectangular form suitable for forming a tray-like moulding having tapered sides is formed, as in FIG. 8, as part of a box 31 from which air can be evacuated. The sheet 32 to be shaped has a generally rectangular form as shown in FIG. 10 but has V-shaped cut-outs 33 at the corners to permit forming of the sheet into the tray shape without wrinkling at the corners. In some cases such cut-outs may not be necessary, particularly where the degree of draw down is small. Sheet 32 is heated and placed in the concave part of mould 30 and lid 34 is sealed against the flanges 35 of the mould 30. A fluid tight seal is effected by means of a sealing ring 36 round the periphery of the underside of lid 34. Clamped to the periphery of lid 34 is a silicone rubber sheet 37. On exhaustion of air from box 30 and on application of fluid pressure to the space between lid 34 and silicone rubber sheet 37, sheet 37 distends forcing the PTFE sheet 32 to conform to the shape of mould 30. Such a system utilising an extensible sheet such as the silicone rubber sheet is particularly useful where it is desired to utilise a liquid to apply the superatmospheric fluid pressure as spillage of liquid is avoided.

Where it is desired to use a core in the mould and utilise a silicone rubber sealing sheet and apply superatmospheric pressure a system such as that shown in FIG. 11 may be used. Here a porous sintered metal mould 38 is provided with a core piece 39 which is a sliding fit in a bore 40 at the base of mould 38. Core piece 39 has a flange 41 at its upper end and a spigot 42 of the size of the desired orifice in the moulding projecting above flange 41. The mould 38 has a recess 43 in its surface to accommodate flange 41 of the core piece 39 when core piece is slid downwards so that the upper face of flange 41 is flush with the surface of mould 38. A light compression spring 44 is provided between a rebate 45 in bore 40 and flange 41 to hold the core piece 39 in the raised position before fluid pressure is applied.

In use, a heated PTFE sheet 46 is located on spigot 42 of core piece 39 and, as in the system shown in FIG. 9, a mould lid 47, in which a silicone rubber sheet 48 is clamped, is sealed to the flanges 49 of mould 38 by a sealing ring 50. Fluid pressure is then applied to the space between lid 47 and silicone rubber sheet 48 and air is evacuated from the mould by application of vacuum to a box 51 in which mould 38 is sealed.

The PTFE sheet 46 deforms to the shape of the mould 38, core piece 39 sliding in bore 40 against the spring pressure, spigot 42 providing means within the hole in sheet 46 to guide the sheet during the shaping.

A similar system utilising a sliding core piece may be used without the silicone rubber sheet, the PTFE sheet being deformed solely by the application of vacuum to exhaust air from the mould cavity. Here the seal round the spigot of the core piece will be provided by the underside of the PTFE sheet engaging with the upper surface of the flange on the core piece.

Where the PTFE sheet is very thin, in the heated state it may not have sufficient rigidity to adequately seal against the walls of the mould.

Figure 12:
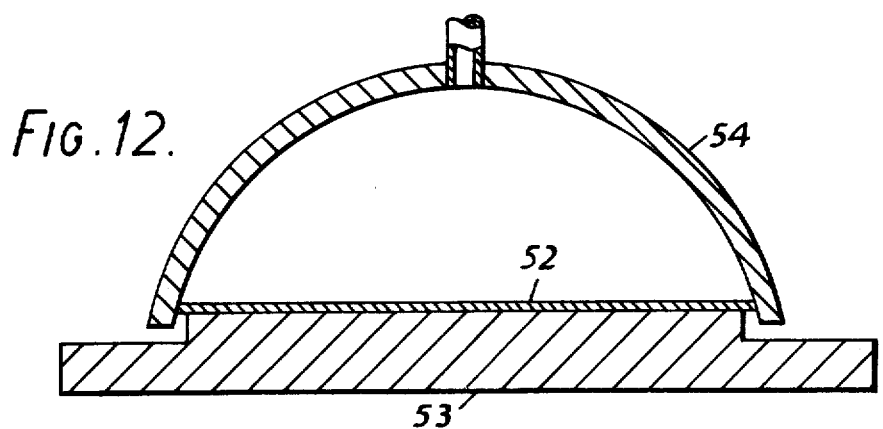
FIG. 12 shows a method of forming a hemispherical moulding using a thin sheet of PTFE.

In such a case a moulding system of the type shown in FIG. 12 may be used. Here the thin heated PTFE sheet 52 is supported on a flat surface 53 with a small area round the perimeter of the PTFE sheet unsupported.

An inverted mould 54 is then located over the supported PTFE sheet 52 so that the unsupported edges of the sheet engage with and seal against the mould 54. On evacuation of the mould cavity, the PTFE sheet 52 is lifted from support 53 and drawn into engagement with the mould surface.

Figure 13:
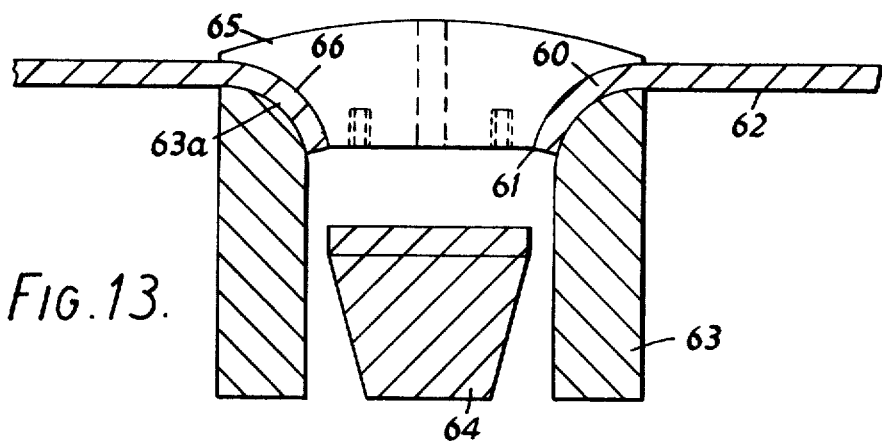
FIG. 13 shows a method of hot coining a sheet prior to shaping.
Figure 14:
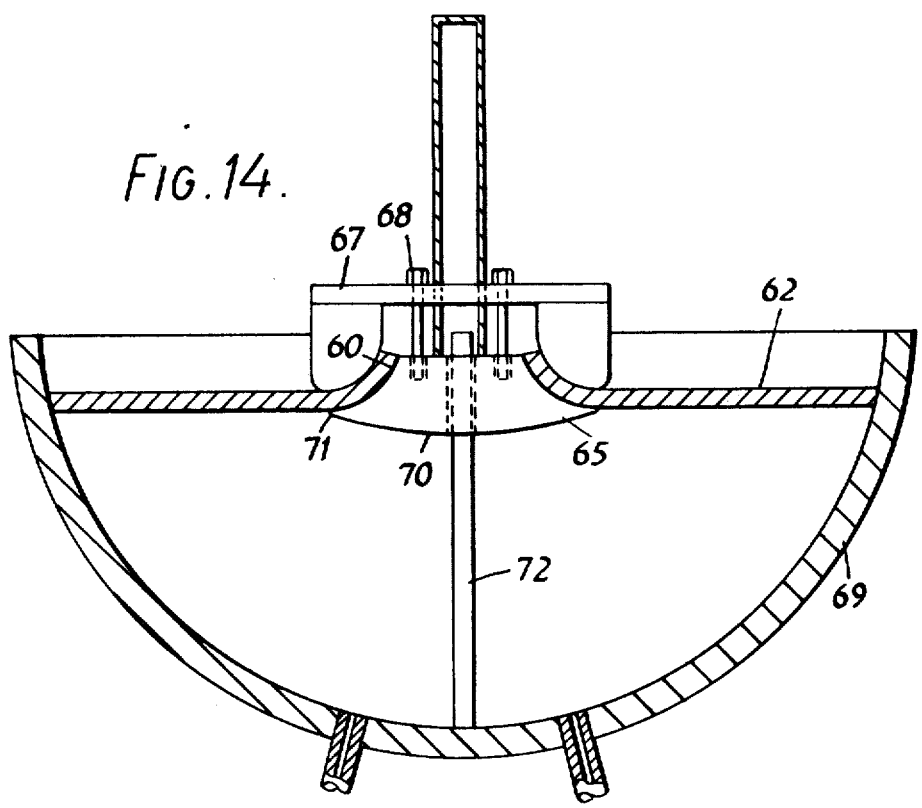
FIG. 14 shows a method of shaping the sheet illustrated in FIG. 13.

Referring to FIGS. 13 and 14, there is illustrated an alternative process for forming a shaped sheet similar to that of FIG. 7. Lips 60 are first formed at the edge of an orifice 61 in a PTFE sheet 62 by a hot coining technique. As seen in FIG. 13, the sheet 62, which is originally flat, is heated sufficiently to enable it to be shaped, preferably to around 360°C, and is placed with orifice 61 over a hollow cylindrical former 63 having a curved internal edge 63a. The former is heated to a temperature similar to that of the sheet. The thin end of a tapered die member 64, also heated to the temperature of the sheet, is then inserted in the orifice in the sheet and is pressed down into the central hole of the former 63 to form the lips 60 against the internal edge 63a, the die passing completely through the sheet after the lips have been formed.

A second die member 65 having a curved surface 66 to correspond to the upper surface of the lips 60 is then brought into contact with the sheet as seen in FIG. 13. The second die member may either be at ambient temperature to chill and set the sheet in the region of the lips 60 or it may be at the same temperature as the sheet.

There is usually sufficient temporary adhesion between the sheet and the second die member to enable the sheet to be lifted from the cylindrical former and inverted. If necessary the second die member can be repositioned once the two have been inverted. The second die member 65 is then clamped in place by means of a shaped clamping device 67 illustrated in FIG. 14 which engages the other side of the lips 60. Bolts 68 received in holes tapped in the die member 65 are used to effect the clamping. By this means, the shape of the lips 60 is preserved in the subsequent forming of the remainder of the sheet which takes place in a part-spherical mould 69 shown in FIG. 14.

The second die member 65 has a radiused surface 70 to enable it to conform to the surface of the mould 69 and a feathered edge 71 so that the formation of a step between the lips 60 and the remainder of the sheet can be avoided. Die member 65 has a central hole enabling it to pass with a sliding fit over an axial cylindrical core 72 in the die which acts as guide means for the sheet during the shaping process. Clamping device 67 has a larger hole coaxial with the central hole of member 65.

The sheet 62 is reheated to forming temperature in an oven and is then loaded into the die 69 with the holes in the member 65 and device 67 passing over the core 72. A tubular cap is then placed through the hole in the clamping device with its open end in contact with the upper surface of member 65 so as to form a seal for the hole in member 65. Vacuum is then applied between the sheet 62 and mould 69. This creates sufficient fluid pressure difference between the upper and lower surfaces of the sheet to cause the sheet to be drawn into the mould and shaped against the spherical mould surface. After allowing the sheet to set while held in the shaped condition, the sheet is taken from the mould and the die member 65 and clamping device 67 are removed. A PTFE sheet formed in this way is useful in bearings.

The sheet to be shaped may be formed by simple preforming and sintering methods. A particularly suitable method of preforming is described in our copending United Kingdom Pat. application No. 33640/70 wherein sheet preforms are made by an isostatic process in which PTFE powder is compacted in a mould consisting of two rigid relatively movable opposed mould members sealed together round their periphery by flexible sealing means. The sheet used in the shaping process of the invention need not be sintered first as the heating step necessary to produce the sheet in the shapable state may be used as the sintering step for the PTFE if carried out above the sintering temperature of PTFE for a suitable length of time.

The sheet to be shaped may be of any thickness but, for ease of shaping, is preferably less than 15 mm. Particularly useful shapings have been made with sheets of thickness 2 to 12 mm.

The invention is of particular utility in making hemispherical bearing pads suitable for use in bogie bearings, for example on bogie railway locomotives, wagons and carriages. For that application it is preferred to use a filled PTFE composition containing graphite or a mixture of graphite and bronze. Such compositions include those sold by Imperial Chemical Industries Limited under the names 'Fluon' VR 15 and 'Fluon' VX 2 respectively.

I claim:

1. A process for the manufacture of shaped articles of polytetrafluoroethylene wherein a sheet of polytetrafluoroethylene is heated to a temperature at which it is shapeable by fluid pressure and is positioned wholly inside a concave mold essentially free of convex portions and is subjected to the effect of atmospheric pressure across substantially the whole of its surface directed away from the mold cavity by the application of an at least partial vacuum between the sheet and the mold so as to cause the sheet to conform to the shape of the mold surface by the free drawing-in of the sheet into the mold during which the periphery of the sheet is allowed to move freely over the mold surface without restraint, the sheet being subsequently held in the mold until it has cooled sufficiently to be form stable.

2. A process according to claim 1 wherein the mould has a curved cross-section in the form of a parabola, hyperbola or part-circle.

3. A process according to claim 1 wherein the fluid pressure is applied to the heated polytetrafluoroethylene sheet through an air impermeable extensible sheet placed over the sheet of polytetrafluoroethylene and sealed to the mould.

4. A process according to claim 1 including the step of forming a hole in the sheet of polytetrafluoroethylene and guiding the sheet by means within said hole as the sheet is shaped in the mould.

5. A process according to claim 4 wherein the mould is provided with an axial core which provides said means to guide the sheet.

* * * * *